(12) United States Patent
Koch et al.

(10) Patent No.: US 9,032,801 B2
(45) Date of Patent: May 19, 2015

(54) ULTRASONIC MEASUREMENT APPARATUS AND METHOD

(71) Applicant: General Electric Company, Schenectady, NY (US)

(72) Inventors: Roman Heinrich Koch, Blankenbach (DE); Gerhard Finger, Limeshain (DE); Heiko Martin Franz Sackenreuther, Klingenberg am Main (DE)

(73) Assignee: General Electric Company, Schenectady, NY (US)

( * ) Notice: Subject to any disclaimer, the term of this patent is extended or adjusted under 35 U.S.C. 154(b) by 283 days.

(21) Appl. No.: 13/658,392

(22) Filed: Oct. 23, 2012

(65) Prior Publication Data
US 2014/0109677 A1  Apr. 24, 2014

(51) Int. Cl.
*G01N 29/04* (2006.01)
*G01B 17/02* (2006.01)

(52) U.S. Cl.
CPC ..................................... *G01B 17/02* (2013.01)

(58) Field of Classification Search
CPC ............................... G01B 17/02; G01N 29/04
USPC ................... 73/627, 622, 579, 597, 598, 602
See application file for complete search history.

(56) References Cited

U.S. PATENT DOCUMENTS

| 4,069,479 | A | * | 1/1978 | Carpenter et al. | 341/139 |
| 4,173,897 | A | * | 11/1979 | Forstermann et al. | 73/609 |
| 4,522,064 | A | * | 6/1985 | McMillan | 73/592 |
| 5,431,054 | A | * | 7/1995 | Reeves et al. | 73/612 |
| 5,497,661 | A | * | 3/1996 | Stripf et al. | 73/611 |
| 5,628,319 | A | | 5/1997 | Koch et al. | |
| 6,250,159 | B1 | | 6/2001 | Kreier et al. | |
| 7,694,566 | B2 | * | 4/2010 | Kleinert | 73/606 |
| 8,291,766 | B2 | * | 10/2012 | Engl et al. | 73/632 |

FOREIGN PATENT DOCUMENTS

| GB | 2371856 A | 8/2002 |
| JP | 20030214834 A | 7/2003 |
| JP | 20040053266 A | 2/2004 |

OTHER PUBLICATIONS

PCT Search Report and Written Opinion issued in connection with corresponding WO Patent Application No. PCT/US2013/061106 dated on Nov. 20, 2013.

* cited by examiner

*Primary Examiner* — J M Saint Surin
(74) *Attorney, Agent, or Firm* — Hiscock & Barclay LLP

(57) ABSTRACT

A method and apparatus for determining a thickness of an object using ultrasonic signals are disclosed. The method includes the steps of transmitting ultrasonic signals toward the object, digitizing a reflected echo sequence of the ultrasonic signals, including interpolating the echo sequence, and processing the echo sequence by detecting maximum amplitude peaks in the echo sequence and determining the object thickness based on a time duration between the maximum amplitude peaks.

21 Claims, 3 Drawing Sheets

ULTRASONIC MEASUREMENT APPARATUS AND METHOD

BACKGROUND OF THE INVENTION

The subject matter disclosed herein relates to ultrasonic measurement devices and methods.

Ultrasonic inspection devices can be used to examine objects in order to measure various dimensions of structures and surfaces in the objects. These ultrasonic devices allow an inspection technician to maneuver an ultrasonic probe at or near the surface of the object in order to perform measurements of the object such as its thickness. Ultrasonic inspection devices and techniques are particularly useful in some industries, e.g., aerospace, power generation, and oil and gas transport or refining (e.g., pipes and welds), where inspection of test objects must take place without removal of the object from surrounding structures, and where interior structures of the objects cannot be measured through visual inspection. When conducting ultrasonic measurement, ultrasonic pulses or signals are emitted from ultrasonic transducers mounted in the ultrasonic probe and pass into a test object. As the ultrasonic signals pass into the object, various ultrasonic reflections called echoes, or echo sequences, occur as the ultrasonic signals interact with exterior and interior surfaces of the test object and are reflected back toward the ultrasonic probe. Large amplitude echoes among the reflected echoes are typically caused by emitted ultrasonic signals reflecting off of exterior and interior surfaces of the test object. These echoes are detected by the ultrasonic transducers in the probe and are analyzed by processing electronics connected to the ultrasonic transducers.

The amplitude and firing sequence of the ultrasonic transducers in the probe can be programmably controlled. The resulting ultrasonic echoes are recorded as echo data by the processing electronics, and include amplitudes and delay times. By tracking the time difference between the emission of the ultrasonic signals and the receipt of the echo data, i.e., the time-of-flight, and measuring the amplitude of the received echo data, various characteristics of a test object can be determined such as, e.g., depth, size, orientation, and thickness. Accordingly, the accuracy of this measurement hinges on the precision of the amplitude and delay resolution achieved with respect to the received echo data. Surfaces and structures of test objects are represented in the return echo sequences as maximum amplitude peaks. Therefore, the magnitude of positive or negative maximum peaks in the echo sequences must be precisely determined, as well as the delay time associated therewith, for accurate measurements to be made.

In an ultrasonic testing device, maximum amplitude peaks are detected by first defining time intervals, i.e. gates, for evaluating received ultrasonic echoes. For each gate a peak value memory detects and records the maximum of the ultrasonic echo detected during the time interval. These gates have a fixed position and width, which are selected according to expected detected thickness ranges and tolerance values. Thus, for a test object having rapidly varying thicknesses to be measured, the maximum threshold within a time interval can be easily exceeded, and so cannot be precisely evaluated. Typically, the echo sequence received at the ultrasonic probe is digitized and stored as echo data immediately after reception. The amplitudes and delay times of the echo sequence are then determined from the stored digital echo data. The accuracy obtainable from using high-frequency ultrasonic signals is limited by the performance of the analog/digital converter (ADC) used, which is determined for the most part by its sampling rate, or sampling frequency, and its bit length. The lower the ratio of sampling frequency to the emitted ultrasonic signal frequency, the poorer the resolution of the amplitude and delay determination. High sampling rate ADCs and associated higher speed memory modules can be prohibitively expensive. If commercially available ADCs and standard memory modules are used, the sampling density of the ultrasonic echo sequences is not sufficient for precise determination of the magnitude of maximum amplitude peaks and their associated delay times.

The gating method described above is not adequate for measuring very small wall thicknesses because the time-of-flight values for the received ultrasonic echo data are short compared to the duration of an emitted ultrasonic pulse. Also, the fixed gate position cannot capture the actual variation of the time-of-flight values of received ultrasonic echoes in such a tolerance range. As mentioned above, rapidly varying wall thickness is another situation where the ultrasonic signal gating method is not adequate for accurate tracking One method of addressing these shortcomings has involved splitting the ultrasonic echo receiving circuit into a plurality of overlapping ADC's to increase its dynamic range and to overcome the need for pre-setting the gates which limits their overall range.

The discussion above is merely provided for general background information and is not intended to be used as an aid in determining the scope of the claimed subject matter.

BRIEF DESCRIPTION OF THE INVENTION

A method and apparatus for determining a thickness of an object using ultrasonic signals are disclosed. The method includes the steps of transmitting ultrasonic signals toward the object, digitizing a reflected echo sequence of the ultrasonic signals, including interpolating the echo sequence, and processing the echo sequence by detecting maximum amplitude peaks in the echo sequence and determining the object thickness based on a time duration between the maximum amplitude peaks. An advantage that may be realized in the practice of some disclosed embodiments of the disclosed ultrasonic testing system is increased precision of commercially available ultrasonic testing devices.

In one exemplary embodiment, a method for determining a thickness of an object is disclosed. The method comprises transmitting ultrasonic signals toward the object and receiving an echo sequence of the transmitted ultrasonic signals that are reflected by first and second surfaces of the object. The echo sequence is digitized and at least one pair of maximum amplitude peaks in the digitized echo sequence identified. A time duration between the maximum amplitude peaks is determined and the thickness of the object is calculated based on the time duration.

In another exemplary embodiment, the method for determining a thickness of an object comprises transmitting ultrasonic signals toward the object and receiving an echo sequence of the ultrasonic signals that are reflected by the object. The reflected ultrasonic signals are digitized and maximum amplitude peaks are detected therein. A time duration between the maximum amplitude peaks is determined and the thickness of the object is calculated based on the time duration.

In another exemplary embodiment, an ultrasonic apparatus for measuring objects is disclosed. The apparatus comprises ultrasonic transducers for transmitting ultrasonic signals, a receiver circuit for receiving a reflected echo sequence of the transmitted ultrasonic signals, an analog/digital converter for digitizing the reflected echo sequence, and a processor programmed to execute an amplitude time locus curves algorithm for detecting at least one pair of maximum amplitude peaks in the digitized reflected echo sequence, interpolate the at least one pair of maximum amplitude peaks in the digitized reflected echo sequence, measure a time delay between the interpolated at least one pair of maximum amplitude peaks, and determine a thickness of the object based on the time delay.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
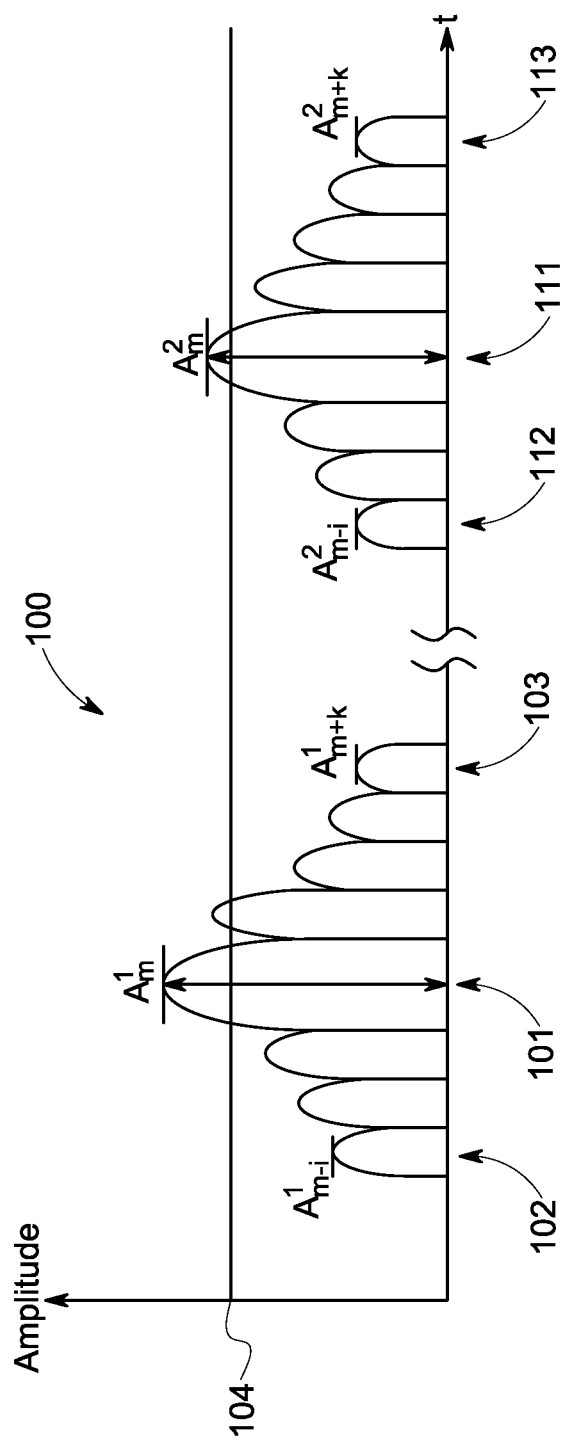
FIG. 1 illustrates an exemplary ALOK peak detection algorithm.

FIG. 1 is an illustration of an exemplary Amplitude Time Locus Curves (ALOK) detection algorithm. An ALOK detection algorithm is used to identify surfaces within a test object that is being measured by an ultrasonic testing device. This particular algorithm does not require use of gated time intervals for processing echo sequences and detecting maximum amplitude peaks therein. The illustrated ultrasonic echo sequences 100 are positive full wave rectified ultrasonic echo sequences 100 plotted as a function of time. ALOK maximum amplitude peaks 101, 111 labeled $A^1_M$ and $A^2_M$, respectively, are each detected and recorded in an ultrasonic testing device when the detected ultrasonic echo sequences 100 each satisfy the following three preselected, programmed criteria: i) a selected number, i, of peaks in front of, i.e. preceding in time, each of maximum amplitude peaks 101, 111 has occurred; ii) a selected number, k, of peaks after, i.e. succeeding in time, each of the maximum amplitude peaks 101, 111 has occurred; and iii) the magnitude of each of the maximum amplitude peaks 101, 111 exceeds the selected threshold amplitude 104. In the example ultrasonic echo sequences 100 shown in FIG. 1, i has been preselected at 3, therefore preceding non-maximum peaks 102, 112 are each numbered $A^1_M-3$ and $A^2_M-3$, respectively; k has been preselected at 4, therefore succeeding non-maximum peaks 103, 113 are each numbered $A^1_M+4$ and $A^2_M+4$, respectively. Exemplary maximum amplitude peak 111 is shown as having a lower magnitude than maximum amplitude peak 101, however, this is not a requirement for detecting a second maximum amplitude peak according to the detection algorithm.

The time difference between the two maximum amplitude peaks 101, 111 in the echo sequence detected by this algorithm represents the thickness of a structure in a test object, for example, a thickness of a pipe wall. This is because the interior surface of the pipe wall and the exterior surface of the pipe wall each caused a maximum amplitude peak to be reflected back toward the ultrasonic testing device. The measured pipe wall thickness can be easily determined using a simple speed x time relationship to calculate the thickness measured thereby:

$$W = c \times (t_{peak2} - t_{peak1})/p_2 - p_1 \tag{1}$$

where W=thickness; c=sound velocity; t=time-of-flight and $$(t_{peak2} - t_{peak1}) \tag{2}$$

is a time duration between maximum amplitude peaks 101, 111; and $p_2$=peak number corresponding to $t_{peak2}$; and $p_1$=peak number corresponding to $t_{peak1}$. Typically, consecutive maximum amplitude peaks are used to determine thickness, although that is not required.

Figure 2:
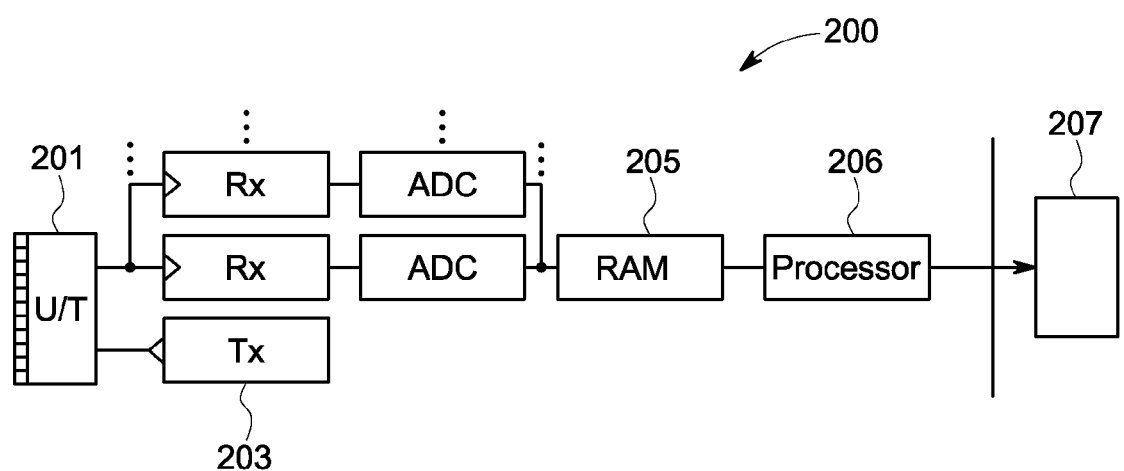
FIG. 2 is a schematic diagram of an ultrasonic testing device.

The accuracy of this detection algorithm can be increased according to an interpolation algorithm. This allows the use of economical standard ultrasonic testing equipment for precisely measuring thicknesses of test objects having rapidly and widely varying thicknesses. FIG. 2 illustrates a schematic diagram of an ultrasonic testing device 200 employing the ALOK algorithm together with an interpolation algorithm for calculating highly accurate measurements of objects undergoing ultrasonic inspection. Ultrasonic testing device 200 is provided with an ultrasonic probe 201 having a plurality of ultrasonic transducers mounted therein for emitting ultrasonic signals toward a test object and for receiving ultrasonic echoes reflected by the test object. The ultrasonic transducers in ultrasonic probe 201 are electrically connected to an ultrasonic transmitter circuit 203 that generates electrical pulses or pulse groups that control the emission of ultrasonic signals from the ultrasonic transducers in ultrasonic probe 201. The ultrasonic transducers in ultrasonic probe 201 are also electrically connected in parallel to a plurality of ultrasonic receivers/amplifiers 202 which, in turn, are each electrically connected to one of a plurality of ADCs 204 that process the received ultrasonic echoes in an overlapping fashion.

The plurality of ADCs are all connected to a write/read RAM memory 205 and a processor 206. In one embodiment, the ultrasonic testing device comprises two or more receivers/amplifiers 202 each connected to one of an equivalent number of ADCs 204. In another embodiment, the two or more receivers/amplifiers 202 are each set at a different gain. Processor 206 executes code for processing the received echo data to implement the ALOK algorithm described herein, and further determines a time delay of any maximum amplitude peaks 101, 111 identified via the ALOK algorithm, as well as calculating a time difference between the pair of maximum amplitude peaks 101, 111 and a thickness of a test object based on the calculated time difference. Also, memory 205 need not be limited to RAM and may include non-volatile storage of any type, such as flash memory, portable removable memory devices, and hard disk drives. The ultrasonic testing device 200 may also be connected to a higher level processing system 207, such as a PC, workstation, laptop, or other processing system.

Using ultrasonic testing device 200, ultrasonic echo sequences 100 are received at ultrasonic transducers mounted in ultrasonic probe 201 and are amplified in ultrasonic receiver circuits 202. These amplified ultrasonic echo sequences 100 are sampled according to a sampling rate and bit length of the ADCs 204, then digitized and stored as ultrasonic echo data in RAM 205. The maximum amplitude peaks in the ultrasonic echo sequences 100, and their corresponding time delays, are determined from the stored digitized ultrasonic echo data using the ALOK algorithm described above. In one embodiment, commercially available components, e.g. commercially available analog/digital converters 204 and a commercially available write/read RAM memory 205 are used. In one embodiment, the ADCs 204 each have a resolution of about eight bits to about thirty-two bits, and the sampling rate (sampling frequency) of the ADCs 204 are each in the range from about 40 MHz to about 200 MHz.

As described above, the accuracy of the ALOK peak detection algorithm can be improved by interpolation of the recorded peak data, in particular the detected maximum amplitude peaks 101, 111. The following interpolation algorithm is executed for each of maximum amplitude peaks 101, 111 in ultrasonic testing device 200 using an interpolation program stored in memory 205 and executed by processor 206. A grade N polynomial is selected as the interpolation function. Other functional approaches are possible, however these generally lead to a non-linear system of equations that can only be solved iteratively, and hence in a calculation intensive form. Discrete measured data points are obtained from the received ultrasonic echo sequences 100 by a time-equidistant sampling rate which are then digitized and stored in memory 205. The stored discrete data points are each represented in memory 205 by a Grade N polynomial according to the following equation:

$$P_N(t_i) = \sum_{n=0}^{N} a_n \cdot t_i^n, \; t_i = i\Delta t \tag{3}$$

where $t_i$ is the sampling time, for i=0, 1 ... N, and $a_n$ the coefficients of the polynomial.

The maximum amplitude peaks 101, 111 of the received ultrasonic echo sequences 100 and/or the delay of the ultrasonic echo sequences 100 with the maximum amplitude peaks 101, 111 are determined using the polynomial. By interpolation with the polynomial, measurement results can be obtained with relatively little calculation work. With the aid of this interpolation method, it is then possible to achieve a high resolution when determining the magnitude of the maximum amplitude peaks 101, 111 and their corresponding delay times, using economical ultrasonic testing devices. Thus, the amplitude and delay measurements as described herein will improve performance of the ultrasonic testing device without requiring hardware replacement.

The sum of the mean fault square is obtained by:

$$F_Q = \sum_{i=0}^{M} (f(t_i) - P_N(t_i))^2 = \sum_{i=0}^{M} \left\{ f^2(t_i) - 2\sum_{n=0}^{N} a_n t_i^n f(t_i) + \sum_{n=0}^{N} a_n t_i^n \sum_{k=0}^{N} a_k t_i^k \right\} \tag{4}$$

From the requirement that the sum of the divergence squares be a minimum, the following is obtained:

$$\frac{\partial F_Q}{\partial a_n} = \sum_{i=0}^{M} \left\{ -2 t_i^n f(t_i) + 2 \sum_{k=0}^{N} a_k t_i^{k+n} \right\} = 0; \tag{5}$$

where n=0, 1, 2 ... N.

Using the abbreviations $$b_{kn} = \sum_{i=0}^{M} t_i^{k+n} \text{ and } c_n = \sum_{i=0}^{M} f(t_i) t_i^n \tag{6}$$

the solution of Equation (5) can be provided:

$$a_k = b_{kn}^{-1} c n; \; n=0, 1, 2, \ldots N \tag{7}$$

with $b_{kn}^{-1}$ to be understood as the elements of the inverse matrix associated with the matrix elements $b_{kn}$.

If N=M is selected, a strict interpolation results, i.e. $F_Q=0$. From M>N, a compensating curve is obtained and the interpolation is redundant with M<N. It is expedient if the delay time of the ultrasonic echo sequences 100 are determined with the amplitude extreme from the first derivation of the Grade N polynomial based on the time delay using the following equation:

$$\frac{\partial P_N}{\partial t} = \sum_{n=0}^{N} n a_n t^{(n-1)} = 0 \tag{8}$$

and that the amplitude extreme is determined by incorporation of the delay value $t=t_0$ into the equation $$P_N(t_0) = \sum_{n=0}^{N} a_n \cdot t_0^n \tag{9}$$

of the grade N polynomial.

The amplitude maximum is determined as follows. First, the time of the amplitude extreme is calculated from the following equation:

$$\frac{\partial P_N}{\partial t} = \sum_{n=0}^{N} n a_n t^{(n-1)} = 0 \tag{10}$$

For N=2, the following results with the coefficients $a_1$ and $a_2$:

$$t_0 = \frac{-a_1}{2a_2} \quad (11)$$

For N=3, it follows with the coefficients $a_1$, $a_2$ and $a_3$:

$$t_{1,2} = \frac{-a_2 \pm \sqrt{4a_2^2 - 3a_1 a_3}}{3a_3} \quad (12)$$

For N=4, three solutions are obtained with the Cardan solution formula. If N>4 is selected, the solution can generally only be determined iteratively. The amplitude maximum is determined by incorporating the appropriate time value into the polynomial formulation given above in Equation (3).

Figure 3:
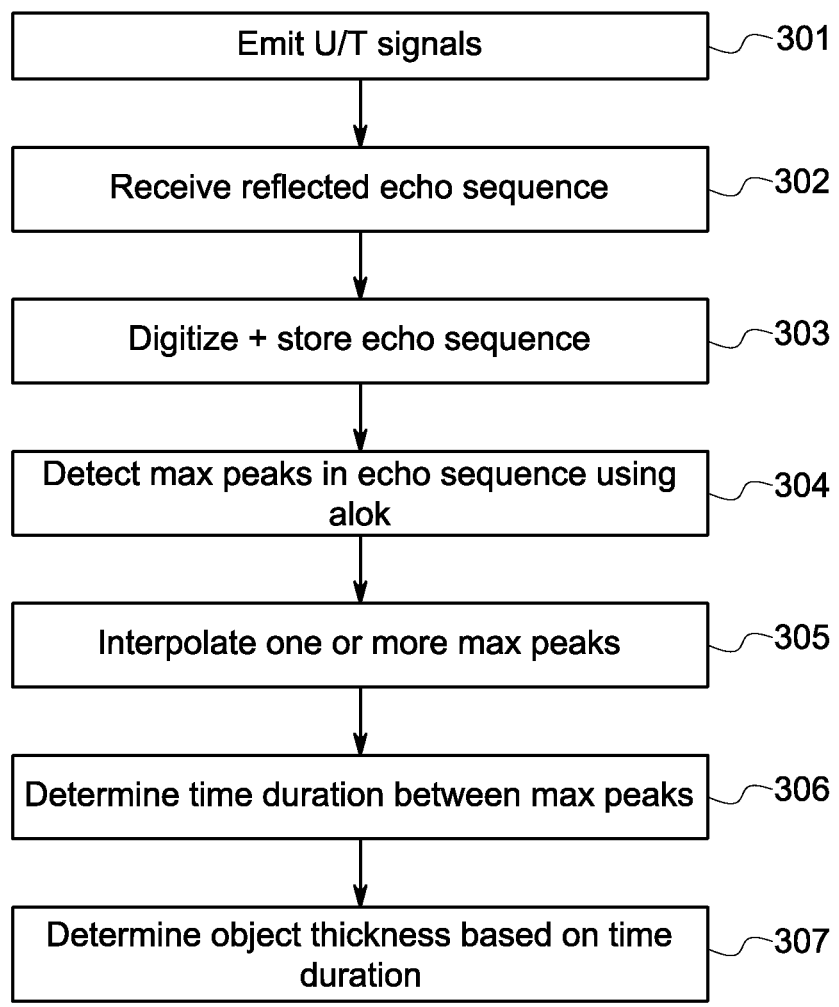
FIG. 3 is a flow chart of a measurement algorithm implemented by the ultrasonic testing device.

With reference to FIG. 3, there is illustrated method steps for determining a thickness of an object using ultrasonic testing device 200. At step 301, ultrasonic signals are emitted toward a test object, such as a pipe, undergoing inspection by ultrasonic testing device 200. At step 302, echo sequences of the emitted ultrasonic signals are reflected from the test object. The echo sequences are detected by ultrasonic testing device 200 and, at step 303, are amplified by the plurality of receivers/amplifiers 202 and digitized by the plurality of overlapping ADCs 204, and stored in memory 205. At least one pair of maximum amplitude peaks in the digitized received echo sequences is identified using the ALOK algorithm at step 304. At step 305, an interpolation algorithm is performed on each of the identified maximum amplitude peaks in the digitized echo sequences, which increases precision of the location of the maximum amplitude peaks, thereby enabling increased precision in the delay times. At step 306, a precise time duration between the at least one pair of maximum amplitude peaks is determined and, at step 307, the thickness of the object is determined based on the time duration.

In view of the foregoing, embodiments of the invention increase ultrasonic measurement accuracy by interpolating digital representations of ultrasonic echo sequences 100 to determine precise time delays of maximum amplitude peaks. A technical effect is that common ultrasonic measurement devices will be able to provide increased measurement accuracy.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "electronics," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A method for determining a thickness of an object, comprising:
   emitting ultrasonic signals toward the object;
   receiving an echo sequence of the ultrasonic signals that are reflected by first and second surfaces of the object;

digitizing and storing the received echo sequence of the ultrasonic signals;

detecting at least one pair of maximum amplitude peaks in the digitized received echo sequence of the ultrasonic signals without using a gated time interval;

applying a signal identification algorithm to the at least one pair of maximum amplitude peaks in the digitized received echo sequence of the ultrasonic signals;

interpolating at least one of the maximum amplitude peaks in the digitized received echo sequence;

measuring a time duration between at least one pair of maximum amplitude peaks; and determining the thickness of the object based on the time duration.

2. The method of claim 1, wherein the step of determining the thickness of the object based on the time duration comprises calculating a distance between the first and second surfaces of the object.

3. The method of claim 1, wherein the step of detecting comprises determining that each of the at least one pair of maximum amplitude peaks exceeds a predetermined threshold amplitude.

4. The method of claim 1, wherein the step of applying a signal identification algorithm includes the step of applying a time amplitude time locus curves algorithm to the digitized received echo sequence of the ultrasonic signals.

5. The method of claim 4, wherein the step of applying an amplitude time locus curves algorithm includes the steps of selecting a predetermined number of peaks to detect in front of a maximum amplitude peak, selecting a predetermined number of peaks to detect after the maximum amplitude peak, and selecting a predetermined amplitude threshold of the maximum amplitude peak.

6. The method of claim 4, wherein the step of interpolating at least one of the maximum amplitude peaks comprises representing the at least one of the maximum amplitude peaks by a Grade N polynomial according to:

$$P_N(t_i) = \sum_{n=0}^{N} a_n \cdot t_i^n, \; t_i = i\Delta t$$

wherein $t_i$, is the sampling time, for i=0, 1 ... N, and $a_n$ the coefficients of the polynomial.

7. The method of claim 6, wherein a delay time of the at least one of the maximum amplitude peaks is determined with the maximum amplitude from the first derivation of the Grade N polynomial based on time using the following equation:

$$\frac{\partial P_N}{\partial t} = \sum_{n=0}^{N} n a_n t^{(n-1)} = 0$$

8. The method of claim 7, wherein the maximum amplitude is determined by incorporation of the delay value $t=t_0$ into the equation $$P_N(t_i) = \sum_{n=0}^{N} a_n \cdot t_i^n$$

of the Grade N polynomial.

9. The method of claim 7, wherein the maximum amplitude is determined by incorporation of the determined delay time into the equation $$P_N(t_i) = \sum_{n=0}^{N} a_n \cdot t_i^n$$

of the Grade N polynomial.

10. A method for determining a thickness of an object, comprising:

emitting ultrasonic signals toward the object;

receiving an echo sequence of the ultrasonic signals that are reflected by the object;

digitizing and storing the received echo sequence of the ultrasonic signals;

detecting at least one pair of maximum amplitude peaks in the digitized received echo sequence of the ultrasonic signals without using a gated time interval;

measuring a time duration between the at least one pair of maximum amplitude peaks; and determining the thickness of the object based on the time duration.

11. The method of claim 10, wherein the step of digitizing comprises sampling the received echo sequence with a sampling rate from about 40 MHz to about 200 MHz.

12. The method of claim 11, wherein the step of digitizing further comprises digitizing the received echo sequence at a resolution from about 8 bits to about 32 bits.

13. The method of claim 11, wherein the step of digitizing further comprises amplifying the received echo sequence using a plurality of amplifiers connected in parallel, each amplifier connected to one of plurality of overlapping analog-to-digital converters, and each amplifier set to a different magnitude of amplification.

14. The method of claim 10, wherein the step of detecting comprises determining that each of the at least one pair of maximum amplitude echoes exceeds a predetermined threshold amplitude.

15. The method of claim 10, wherein the step of detecting at least one pair of maximum amplitude peaks in the digitized received echo sequence comprises applying an amplitude time locus curves algorithm to the received digitized echo sequence of the ultrasonic signals.

16. The method of claim 15, wherein the step of measuring a time duration between the at least one pair of maximum amplitude peaks comprises interpolating at least one of the maximum amplitude peaks in the digitized received echo sequence.

17. The method of claim 16, wherein the step of interpolating at least one of the maximum amplitude peaks comprises replacing a function represented by the at least one of the maximum amplitude peaks by a Grade N polynomial according to:

$$P_N(t_i) = \sum_{n=0}^{N} a_n \cdot t_i^n, \; t_i = i\Delta t$$

wherein $t_i$, is the sampling time, for i=0, 1 ... N, and $a_n$ the coefficients of the polynomial.

18. The method of claim 17, wherein a delay time of the at least one of the maximum amplitude peaks is determined with the maximum amplitude from the first derivation of the Grade N polynomial based on time using the following equation:

$$\frac{\partial P_N}{\partial t} = \sum_{n=0}^{N} n a_n t^{(n-1)} = 0$$

and the maximum amplitude is determined by incorporation of the delay value $t=t_0$ into the equation $$P_N(t_i) = \sum_{n=0}^{N} a_n \cdot t_i^n$$

of the Grade N polynomial.

19. The method of claim 17, wherein a delay time of the at least one of the maximum amplitude peaks is determined with the maximum amplitude from the first derivation of the Grade N polynomial based on time using the following equation:

$$\frac{\partial P_N}{\partial t} = \sum_{n=0}^{N} n a_n t^{(n-1)} = 0$$

and the maximum amplitude is determined by incorporation of the determined delay time into the equation $$P_N(t_i) = \sum_{n=0}^{N} a_n \cdot t_i^n$$

of the Grade N polynomial.

20. An apparatus comprising:
an ultrasonic transducer for emitting ultrasonic signals;
a receiver circuit including a plurality of amplifiers connected in parallel for receiving a reflected echo sequence of the emitted ultrasonic signals;
a plurality of overlapping analog/digital converters each connected to one of the amplifiers for digitizing the reflected echo sequence; and
a processor programmed to execute an amplitude time locus curves algorithm for detecting at least one pair of maximum amplitude peaks in the digitized reflected echo sequence without using a gated time interval, to interpolate the at least one pair of maximum amplitude peaks in the digitized reflected echo sequence, to measure a time delay between the interpolated at least one pair of maximum amplitude peaks, and to determine a thickness of the object based on the time delay.

21. A method for determining a thickness of an object, comprising:
emitting ultrasonic signals toward the object;
receiving an echo sequence of the ultrasonic signals that are reflected by first and second surfaces of the object;
digitizing and storing the received echo sequence of the ultrasonic signals;
detecting at least one pair of maximum amplitude peaks in the digitized received echo sequence of the ultrasonic signals without using a gated time interval;
applying a signal identification algorithm to the at least one pair of maximum amplitude peaks in the digitized received echo sequence of the ultrasonic signals;
interpolating at least one of the maximum amplitude peaks in the digitized received echo sequence;
measuring a time duration between at least one pair of maximum amplitude peaks; and
determining the thickness of the object based on the time duration,
wherein the step of applying a signal identification algorithm includes the step of applying a time amplitude time locus curves algorithm to the digitized received echo sequence of the ultrasonic signals, and
wherein the step of applying an amplitude time locus curves algorithm includes the steps of selecting a predetermined number of peaks to detect in front of a maximum amplitude peak, selecting a predetermined number of peaks to detect after the maximum amplitude peak, and selecting a predetermined amplitude threshold of the maximum amplitude peak.

* * * * *